Apr. 3, 1923.
J. HAERING
COW TAIL HOLDER
Filed May 16, 1922
1,450,774
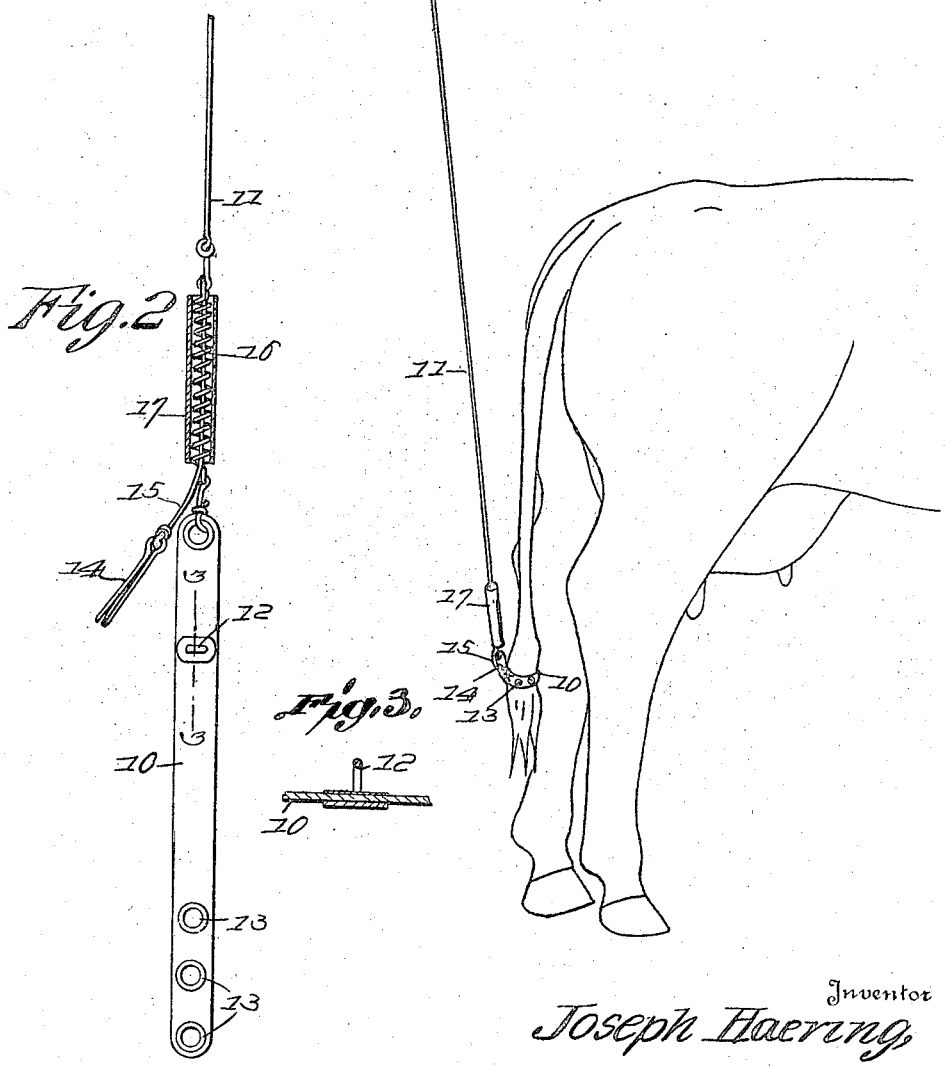
Inventor
Joseph Haering,
By
Attorney Patented Apr. 3, 1923.

1,450,774

UNITED STATES PATENT OFFICE.

JOSEPH HAERING, OF LOUISVILLE, KENTUCKY.

COW-TAIL HOLDER.

Application filed May 16, 1922. Serial No. 561,501.

*To all whom it may concern:*

Be it known that JOSEPH HAERING, a citizen of the United States of America, residing at Louisville, in the county of Jefferson and State of Kentucky, has invented new and useful Improvements in Cow-Tail Holders, of which the following is a specification.

The object of the invention is to provide simple and efficient means for holding a cow's tail in position to avoid contact with the floor of the stall when the animal is lying down and also to prevent switching or swinging of the tail when the cow is being milked, and which at the same time is adapted to release the tail under a strain should the attendant fail through neglect or oversight to release the same when the animal is turned out to pasture; and with this object in view the invention consists in a construction and combination of parts of which a preferred embodiment is shown in the accompanying drawings, wherein—

Figure 1 is a view of a device embodying the invention arranged in the operative position.

Figure 2 is a detail view thereof partly in section.

Figure 3 is a section on the line 3—3 of Figure 2.

The device consists of a tail clasp 10 preferably of flexible material such as a strap or its equivalent adapted to be looped around the tail of the animal and secured against accidental displacement, one end of said clasp being connected with a supporting cord or rope 11 which is adapted to be attached to an overhead object such as a beam in the stall for permitting a certain amount of freedom of movement of the tail without allowing sufficient latitude to interfere with the milking operation or permit the tail to become contaminated by contact with accumulations on the floor of the stall. In the construction illustrated the clasp is provided with a staple 12 for engagement selectively by a series of eyes 13, and in connection therewith there is employed a key or pin 14 to be engaged with the staple when a proper adjustment of the clasp has been effected and one of the eyes has been engaged with the staple, to hold the clasp in place on the animal's tail. This key is connected by a flexible cord or thong 15 with the supporting cord or rope, and interposed in the supporting cord or rope is a cushioning spring 16 to yieldingly resist the efforts of the animal to switch the tail. Should a strain, however, be applied to the clasp, for example, as by the animal attempting to leave the stall in going to pasture, should the attendant have failed to release or open the clasp, the strain upon the spring will tension the connection between the supporting cord or rope and the key and thereby draw the key out of engagement with the staple so as to permit the opening of the clasp and the release of the animal. The spring is preferably enclosed in a flexible sleeve 17 which merely serves as a protection to prevent the rusting or accumulation of dirt thereon.

Having described the invention, what is claimed as new and useful is:—

1. A cow tail holder having a yieldingly supported clasp for engaging a cow's tail, said clasp consisting of a flexible band provided with a staple and having a plurality of eyes for selective engagement with said staple, and a key engageable with the staple to hold the selected eye in place thereon and displaceable by a strain on the clasp.

2. A cow tail holder having a yieldingly supported clasp for engaging a cow's tail, said clasp consisting of a flexible band provided with a staple and having a plurality of eyes for selective engagement with said staple, and a key engageable with the staple to hold the selected eye in place thereon, said key having connection with the support for displacement by a strain applied to the clasp.

3. As an article of manufacture a cow tail holder having a clasp and means for securing the same to a cow's tail, a flexible support for said clasp consisting of a cord or rope attachable to an overhead object in the stall and including a cushioning spring tensionable by strain upon the clasp, said clasp having a staple for engagement by an eye to hold the clasp in tail engaging position, and a key flexibly connected with the supporting rope or cord and adapted to be withdrawn from the staple by the tensioning of said spring.

In testimony whereof he affixes his signature.

JOSEPH HAERING.